(12) United States Patent
Spagnuolo

(10) Patent No.: US 9,435,534 B2
(45) Date of Patent: Sep. 6, 2016

(54) ENERGY-RECOVERY SYSTEM FOR A PRODUCTION PLANT

(75) Inventor: Joseph G. Spagnuolo, Westlake, OH (US)

(73) Assignee: HOLISTIC ENGINEERING INC, Westlake, OH (US)

( * ) Notice: Subject to any disclaimer, the term of this patent is extended or adjusted under 35 U.S.C. 154(b) by 1866 days.

(21) Appl. No.: 12/623,665

(22) Filed: Nov. 23, 2009

(65) Prior Publication Data
US 2011/0048016 A1 Mar. 3, 2011

Related U.S. Application Data

(60) Provisional application No. 61/238,350, filed on Aug. 31, 2009.

(51) Int. Cl.

| | |
|---|---|
| *F01K 19/10* | (2006.01) |
| *F25B 40/02* | (2006.01) |
| *F28D 15/00* | (2006.01) |
| *F23J 15/06* | (2006.01) |
| *B01D 53/00* | (2006.01) |
| *B01D 53/14* | (2006.01) |
| *F24D 5/12* | (2006.01) |
| *F24D 12/02* | (2006.01) |
| *F24H 6/00* | (2006.01) |
| *F28D 21/00* | (2006.01) |

(52) U.S. Cl.
CPC .............. *F23J 15/06* (2013.01); *B01D 53/002* (2013.01); *B01D 53/1475* (2013.01); *F24D 5/12* (2013.01); *F24D 12/02* (2013.01); *F24H 6/00* (2013.01); *F24D 2200/18* (2013.01); *F28D 21/0003* (2013.01); *Y02B 30/14* (2013.01); *Y02C 10/06* (2013.01); *Y02E 20/363* (2013.01)

(58) Field of Classification Search
USPC ........ 60/688, 685, 694; 165/104.11; 62/515; 290/52
See application file for complete search history.

(56) References Cited

U.S. PATENT DOCUMENTS

| | | | |
|---|---|---|---|
| 3,953,966 A | 5/1976 | Martz et al. | |
| 4,270,343 A * | 6/1981 | Shirato | 60/775 |
| 4,430,854 A * | 2/1984 | Adrian et al. | 60/781 |
| 4,462,206 A | 7/1984 | Aguet | |
| 5,467,722 A * | 11/1995 | Meratla | 110/345 |
| 5,772,734 A * | 6/1998 | Baker et al. | 95/42 |
| 5,799,481 A | 9/1998 | Fetescu | |
| 5,992,138 A | 11/1999 | Bruckner et al. | |
| 6,018,942 A | 2/2000 | Liebig | |
| 6,032,467 A * | 3/2000 | Oshita et al. | 60/651 |
| 6,079,212 A * | 6/2000 | Tatani et al. | 60/694 |
| 6,141,956 A | 11/2000 | Iijima et al. | |

(Continued)

OTHER PUBLICATIONS

Stationary Source Control Techniques Document for Fine Particulate Matter, EPA Contract No. 68-D-98-026, Work Assignment No. 0-08. U.S. Environmental Protection Agency, Research Triangle Park, North Carolina, 27711. Oct. 1998.*

*Primary Examiner* — Kenneth Bomberg
*Assistant Examiner* — Deming Wan
(74) *Attorney, Agent, or Firm* — Eric Todd Shaffer

(57) ABSTRACT

A production plant comprises a primary-process system (10) and an energy-recovery system (100). The energy-recovery system (100) includes a fluid line (110) for conveying a medium and a heat exchanger (120) placing the fluid line (110) in heat-transfer relationship with an exhaust line (40) upstream of a scrubber (70). The heat exchanger (120) causes condensation of water vapor within the exhaust line (40) and transfers heat to the medium within the fluid line (110).

20 Claims, 6 Drawing Sheets

(56) References Cited

U.S. PATENT DOCUMENTS

| | | | |
|---|---|---|---|
| 6,145,295 A | 11/2000 | Donovan et al. | |
| 6,256,978 B1 | 7/2001 | Gericke et al. | |
| 6,343,570 B1* | 2/2002 | Schmid et al. | 122/7 R |
| 6,574,962 B1 | 6/2003 | Hsu | |
| 6,598,399 B2 | 7/2003 | Liebig | |
| 6,604,354 B2 | 8/2003 | Oto et al. | |
| 6,938,417 B2* | 9/2005 | Watanabe et al. | 60/597 |
| 6,957,540 B1 | 10/2005 | Briesch et al. | |
| 7,021,056 B2* | 4/2006 | Watanabe et al. | 60/597 |
| 7,043,923 B2 | 5/2006 | Ahmed et al. | |
| 7,062,912 B2* | 6/2006 | Penfornis et al. | 60/649 |
| 7,076,957 B2 | 7/2006 | Ahmed et al. | |
| 7,096,672 B1 | 8/2006 | Ahmed et al. | |
| 7,107,774 B2 | 9/2006 | Radovich | |
| 7,367,192 B2 | 5/2008 | Hattori et al. | |
| 7,543,438 B2 | 6/2009 | Wojak | |
| 2006/0185369 A1 | 8/2006 | Ahmed et al. | |
| 2008/0178604 A1 | 7/2008 | Poline | |
| 2008/0216510 A1 | 9/2008 | Vandor et al. | |
| 2009/0064656 A1 | 3/2009 | Oomens et al. | |
| 2009/0078177 A1* | 3/2009 | Wu et al. | 110/233 |
| 2009/0282803 A1 | 11/2009 | Bono et al. | |
| 2010/0011778 A1 | 1/2010 | Knight et al. | |

* cited by examiner

ENERGY-RECOVERY SYSTEM FOR A PRODUCTION PLANT

RELATED APPLICATION

This application claims priority under 35 U.S.C. §119(e) to U.S. Provisional Patent Application No. 61/238,350 filed on Aug. 31, 2009. The entire disclosure of this application is hereby incorporated by reference. To the extent that inconsistencies may occur between the present application and the incorporated application, the present application governs interpretation to the extent necessary to avoid indefiniteness and/or clarity issues.

BACKGROUND

A production plant can comprise a furnace which combusts fuel to further production of the primary product. If so, the plant will typically include a stack through which flue gas exits to the atmosphere and an exhaust line extending from the furnace to the stack. If the fuel comprises coal or oil, a scrubber will usually be provided to remove pollutants from the flue gas prior to its exit from the stack. In a wet scrubber, for example, the flue gas is brought into contact with a scrubbing liquid (e.g., water) so that pollutant particles are captured in liquid droplets and/or pollutant gasses are dissolved or absorbed into the liquid. A wet scrubber commonly operates at about 120° F. to 180° F. under saturated water conditions and is often the last step prior to releasing flue gas through the stack.

SUMMARY

An energy-recovery system is provided which recovers a significant amount of energy in the flue gas upstream of the wet scrubber. In this system, a heat exchanger is used to condense water vapor to thereby capitalize on the heat-of-vaporization. An added benefit may be that the carbon dioxide is captured in the condensed water, thereby reducing carbon dioxide emissions. Additionally or alternatively, the condensed water is relatively pure and can be further processed and returned to the primary-process system or other situation requiring high quality water.

DRAWINGS

DESCRIPTION

Figure 1:
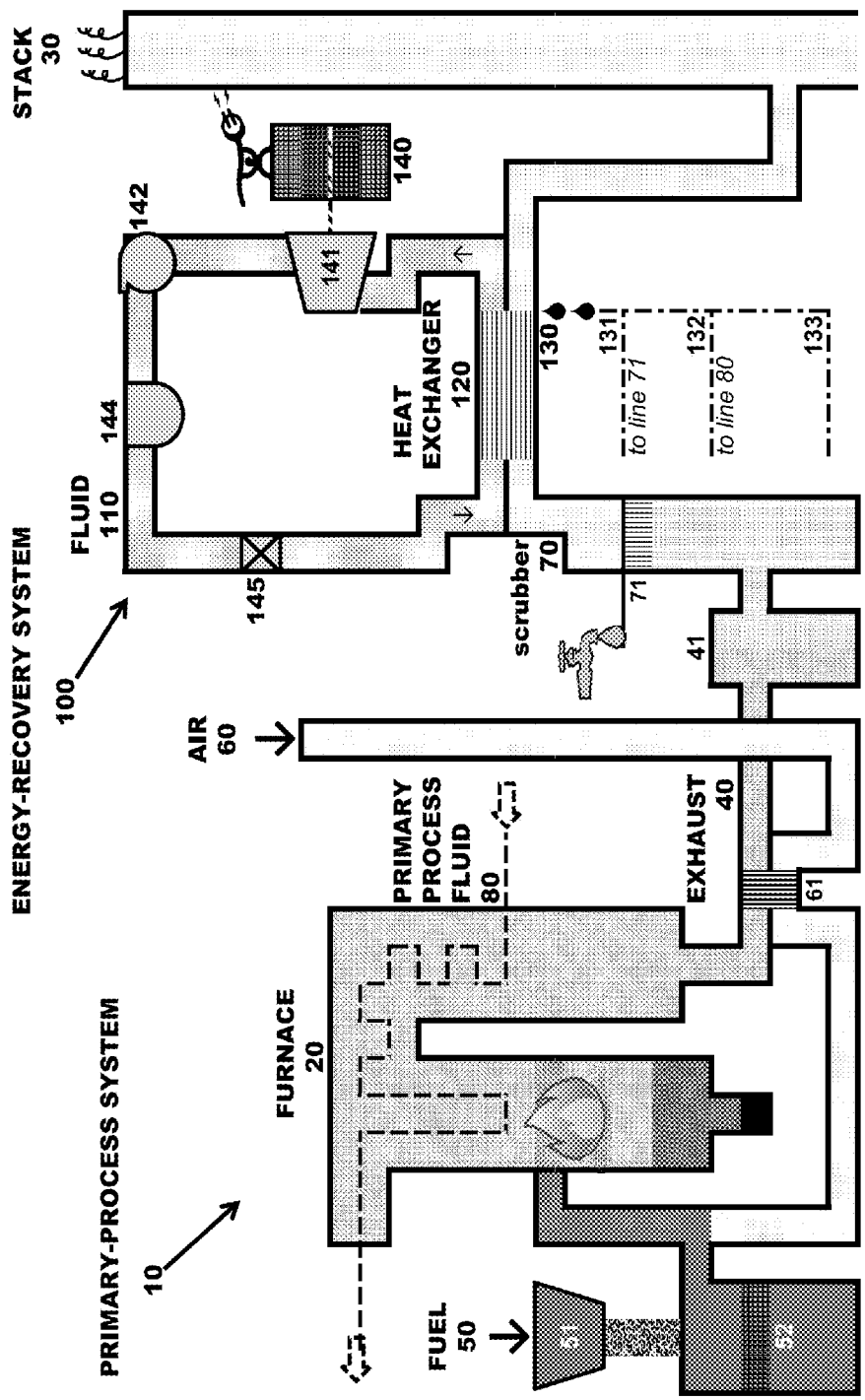
FIGS. 1-4 are each a schematic diagram of a production plant incorporating an energy-recovery system.

Referring now to the drawings, and initially to FIG. 1, a production plant is schematically shown comprising a primary-process system 10. The primary-process system 10 comprises a furnace 20 that combusts fuel to further production of a primary product and a stack 30 through which combustion gas exits the production plant. An exhaust line 40 extends from the furnace 20 to the stack 30.

The primary-process system 10 can further comprise a fuel-feed line 50 and an air-intake line 60 that provide fuel and air to the furnace 20. In the illustrated embodiment, coal is the supplied fuel whereby the feed line 50 can incorporate a hopper 51 and/or pulverizer 52. An air preheater 61 can be used to preheat air in the intake line 60 (via heat exchange with the exhaust line 40) prior to its entry into the furnace 20.

As the furnace fuel comprises coal, a wet scrubber 70 is provided to remove pollutants from the flue gas prior to its exit from the stack 30. In the wet scrubber 70, a scrubbing liquid (e.g., water) is introduced into the flue gas via waterline 71. Flue gas is brought into contact with the scrubbing liquid so that pollutant particles are captured in liquid droplets and/or pollutant gasses are dissolved or absorbed into the liquid. The wet scrubber 70 operates at about 120° F. to 180° F. at water-saturation conditions.

The exhaust line 40 can include other pollution-control devices. For example, as shown, a precipitator 41 can be positioned upstream of the wet scrubber 70. The scrubber 70, however, will usually be the last the pollution-control device the flue gas encounters on route to the stack 30.

The illustrated plant produces electrical power (i.e., it is a power plant). Accordingly, its furnace 20 can be called a boiler and its primary-process system 10 further comprises a primary-process fluid line 80. In a power plant, the line 80 commonly conveys water/steam through a closed turbine cycle (not shown) operably connected to a main generator. But the production plant need not produce power and/or include a primary-process line 80. The plant could be, for example, part of a steel mill or other production that uses heat generated by the furnace 20 but does not include a primary-process-fluid line 80.

The production plant further comprises an energy-recovery system 100 including a fluid line 110 for conveying a fluid and a heat exchanger 120 placing the fluid line 110 in heat-transfer relationship with the exhaust line 70 downstream of the scrubber 70. The heat exchanger 120 is used to condense water vapor within the exhaust line 40 to thereby capitalize on the heat-of-vaporization. An added benefit may be that the carbon dioxide is captured in the condensed water, thereby reducing carbon dioxide emissions.

The condensed water in the exhaust line 40 will be relatively pure and can be extracted via a line 130 for further processing. The processed water can then be returned (via subline 131) to the scrubber 70, ejected into the primary-process-fluid line 80 (via subline 132) or otherwise plumbed (via subline 133) to another situation requiring high quality water.

In the production plant shown in FIG. 1, the energy-recovery system 100 powers a generator 140 for producing electricity. The fluid line 110 can convey a refrigerant that evaporates within the expected temperature range of the flue gas exiting the scrubber 70 (e.g., greater than 110° F., greater than 120°, and/or greater than 130°) whereby the heat exchanger 120 comprises an evaporator. A turbine 141, operably coupled to the generator 140, can be situated downstream of the heat exchanger 120, a compressor 142 can be situated downstream of the turbine 141, a condenser 144 can be situated downstream of the compressor 142, and an expander 145 can be positioned upstream of the heat exchanger 120.

Figure 2:
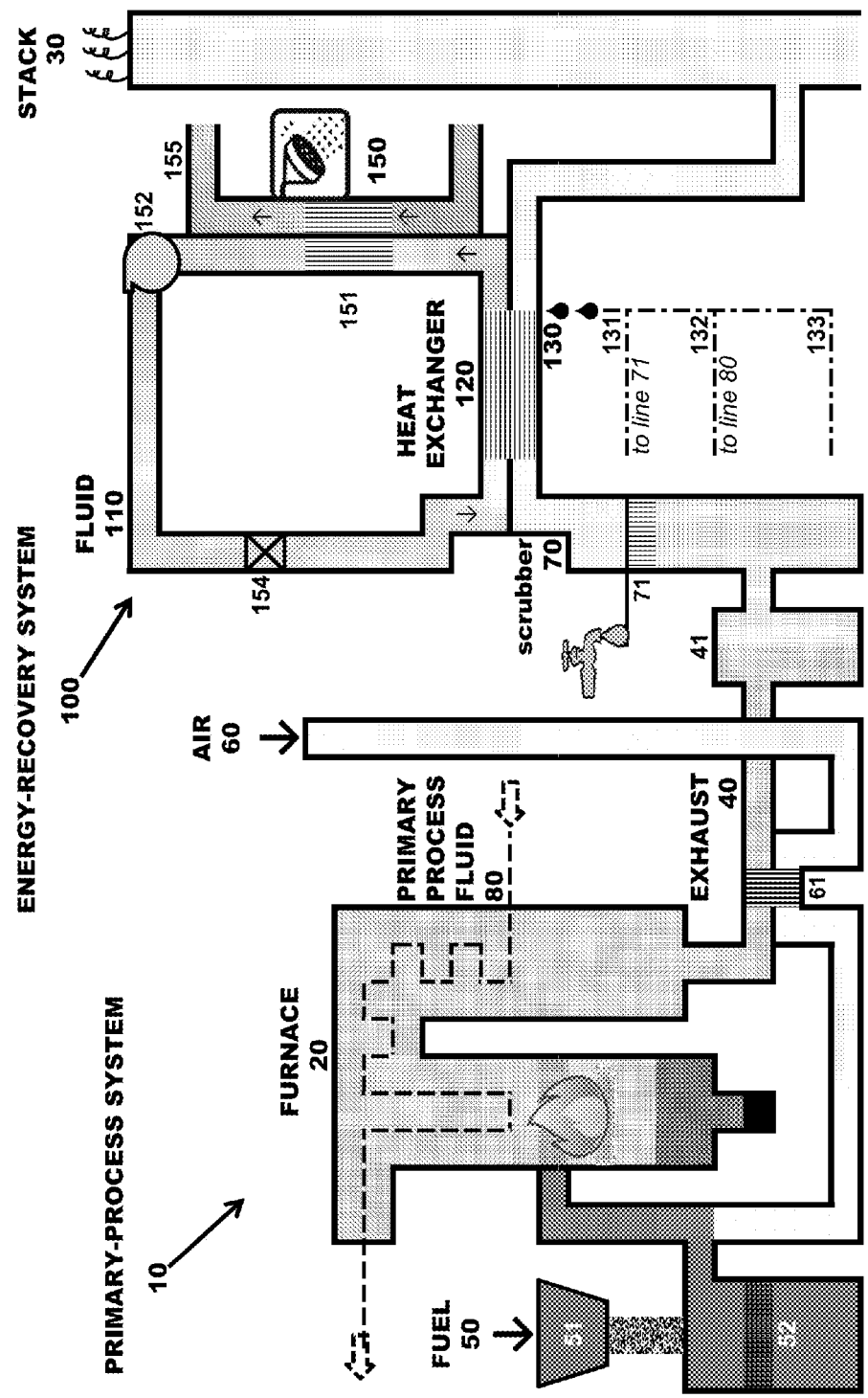

In the production plant shown in FIG. 2, the energy-recovery system 100 is used to heat house water (e.g., for showers, sinks, etc). The fluid line 110 can again convey a refrigerant (that evaporates within the expected temperature range of the flue gas exiting the scrubber 70). But instead of turbine, a condenser 151 is provided to transfer heat from the fluid line 110 to a water line 155.

Figure 3:
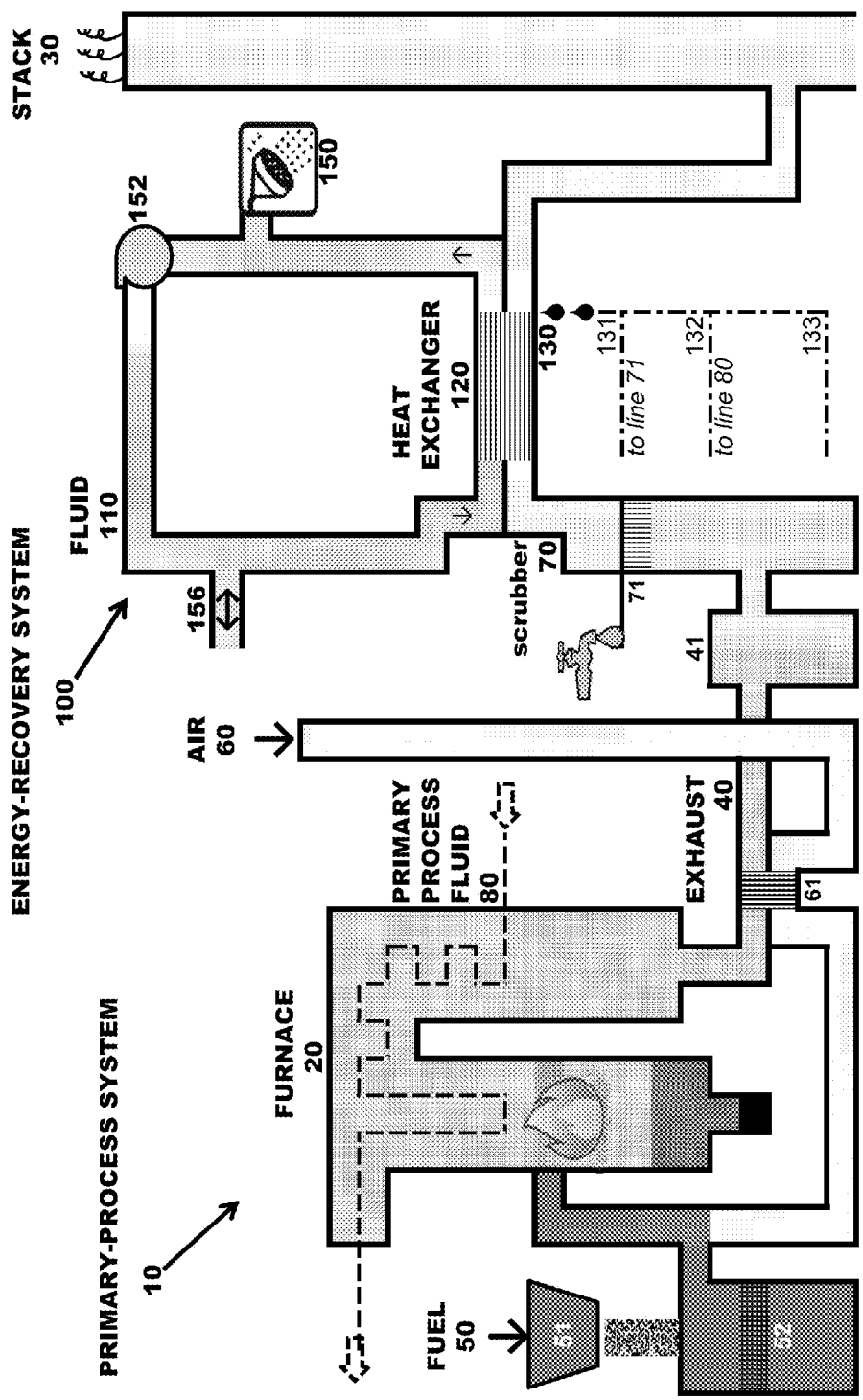

In the production plant shown in FIG. 3, the energy-recovery system 100 is again used to heat house water. But in this plant, the fluid line 110 can convey water which is directly heated by the exhausted line 40 as it travels through heat exchanger 120. A pump 152 can be provided to convey the heated house water. As water will be supplied directly from line 110, a replenishing line 156 may be necessary to compensate for dispensed house water.

Figure 4:
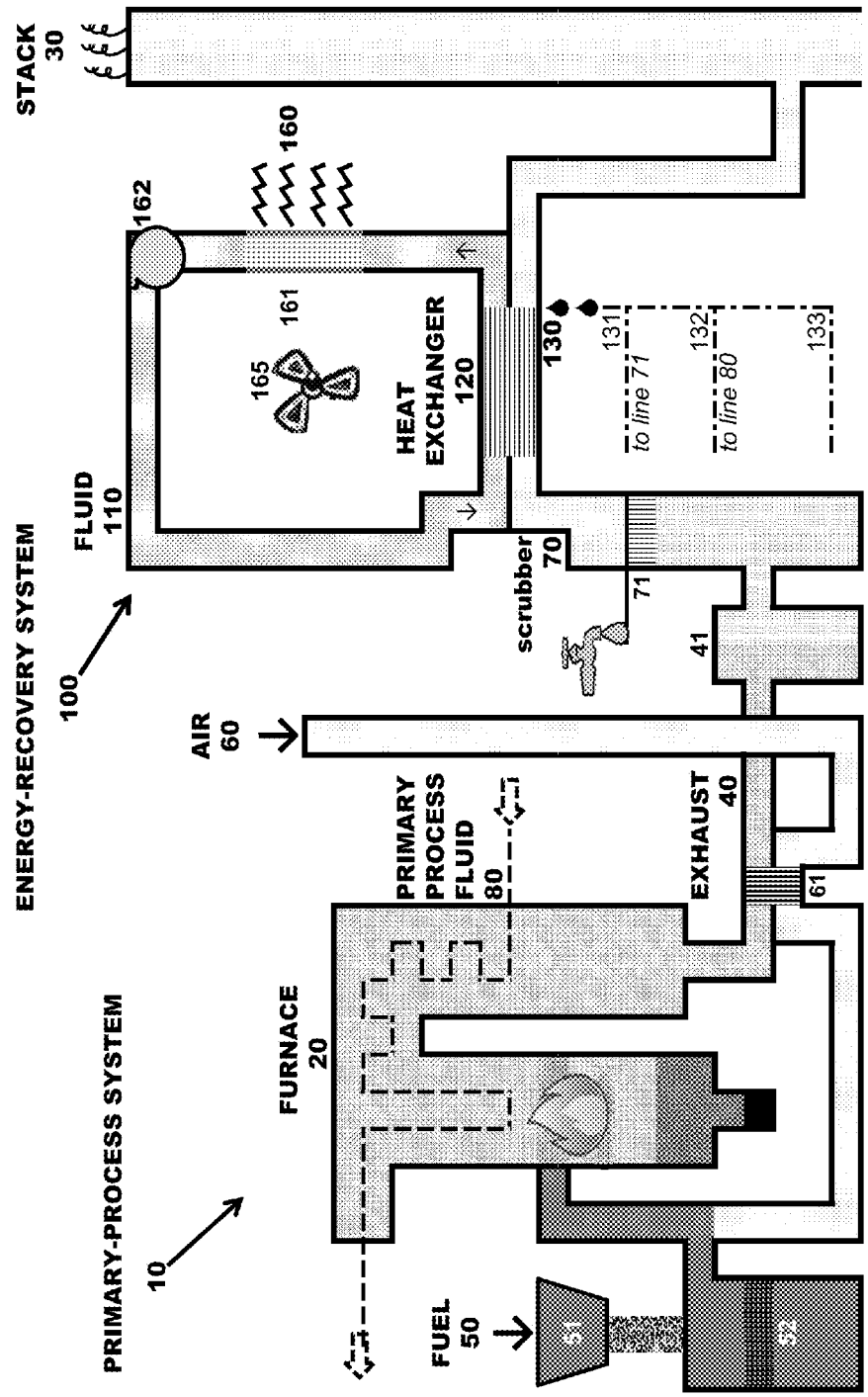

In the production plant shown in FIG. 4, the energy-recovery system 100 is used to as a heating source for house air ventilation 160. In this system 100, the fluid line 110 can convey either refrigerant or water. A fan 165 can be provided to push air through the relevant portion 161 of the system 100.

Figure 5:
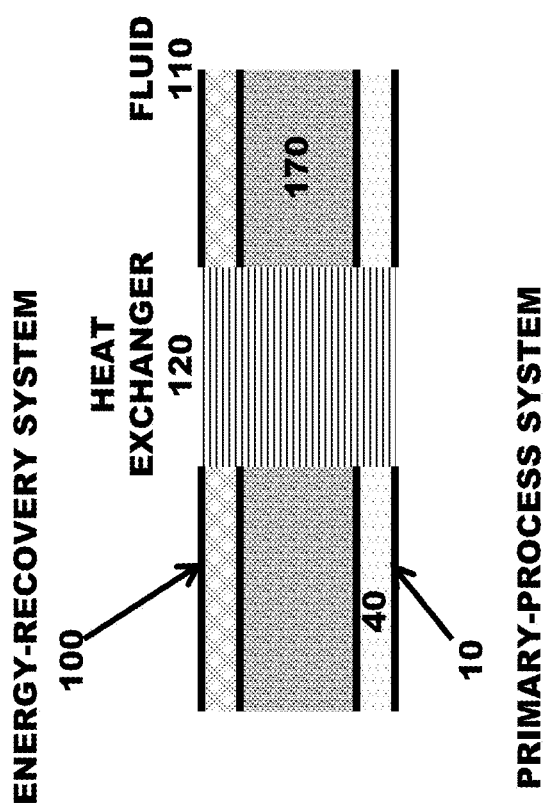
FIGS. 5-8 are schematic diagrams of modified versions of the energy-recovery system.
Figure 8:
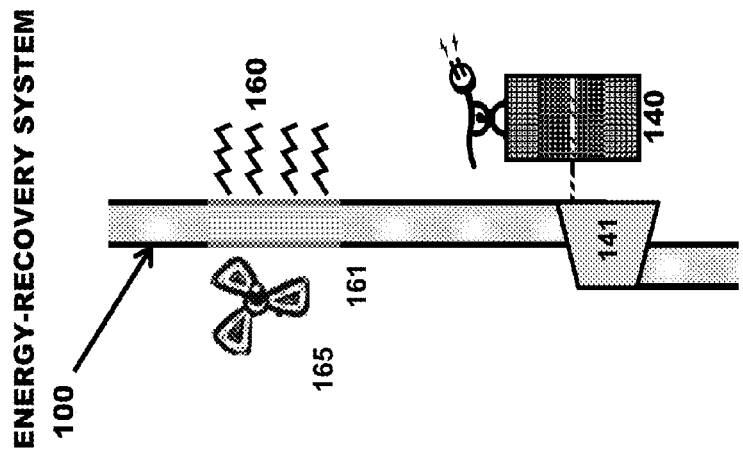
Figure 7:
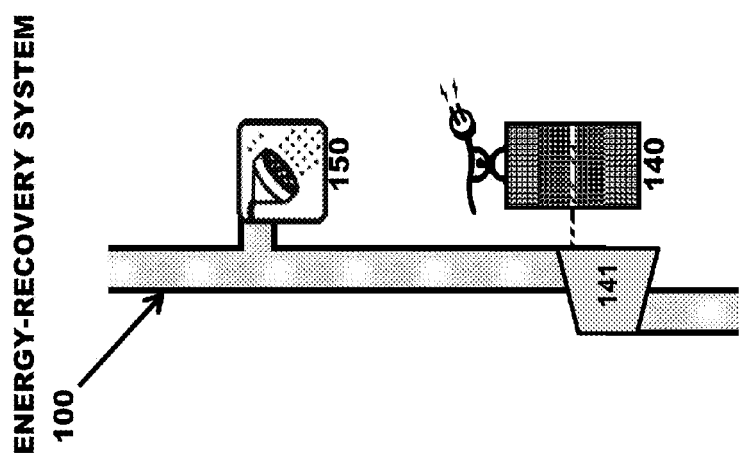
Figure 6:
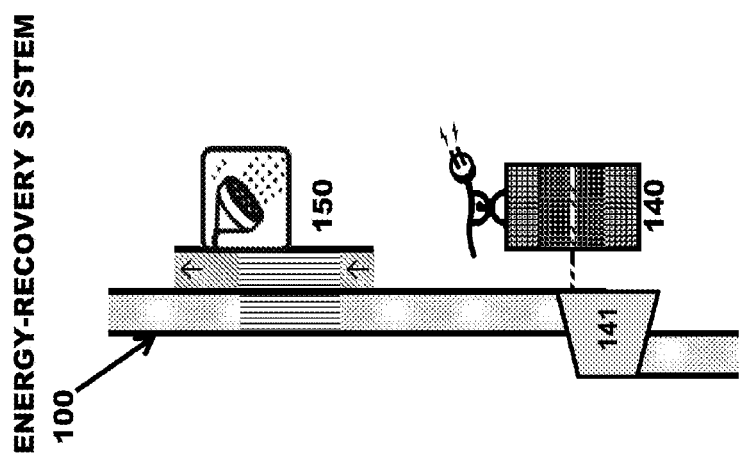

In the production plants shown in FIGS. 1-4, the heat from the exhaust line 40 in the primary-process system 10 transferred directly to the fluid line 110 in the energy-recovery system 100. But an intermediate or transfer fluid 170 can instead be used as shown in FIG. 5. Additionally or alternatively, as shown in FIGS. 6-8, the turbine 141 (and generator 140) can be used in conjunction with a house-water heating and/or air ventilation 160.

Although the system has been shown and described with respect to a certain embodiment or embodiments, it is obvious that equivalent alterations and modifications will occur to others skilled in the art upon the reading and understanding of this specification and the annexed drawings. In regard to the various functions performed by the above described elements (e.g., components, assemblies, systems, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A production plant, comprising:
a primary-process system including a furnace which combusts fuel to further production of electrical power by heating water/steam in a primary-process fluid line which conveys the water/steam through a closed turbine cycle operably connected to a main generator, a stack through which flue gas exits the production plant, an exhaust line extending from the furnace to the stack, and a scrubber which introduces water into the exhaust line; and
an energy-recovery system including an energy-recovery fluid line for conveying a medium and a heat exchanger placing the energy-recovery fluid line in heat-transfer relationship with the exhaust line downstream of the scrubber.

2. A production plant as set forth in claim 1, wherein the scrubber causes pollutant particles within the flue gas to be captured in liquid droplets and/or pollutant gasses within the flue gas to be dissolved or absorbed into the liquid.

3. A production plant as set forth in claim 2, wherein the expected temperature range of the flue gas exiting the scrubber is greater than 110° F.

4. A production plant as set forth in claim 2, wherein the flue gas exiting the heat exchanger is at water-condensing conditions.

5. A production plant as set forth in claim 1, wherein the exhaust line transfers heat directly to the energy-recovery fluid line of the energy-recovery system.

6. A production plant as set forth in claim 1, wherein the exhaust line transfers heat to an intermediate fluid which then transfers heat to the energy-recovery fluid line of the energy-recovery system.

7. A production plant as set forth in claim 1, wherein the energy-recovery system powers a generator for producing electricity.

8. A production plant as set forth in claim 1, wherein the energy-recovery system:
provides heated water to a house-water supply, and/or
serves to heat ventilation air.

9. A production plant as set forth in claim 1, wherein the energy-recovery fluid line is part of a closed fluid cycle.

10. A production plant as set forth in claim 1, wherein the energy-recovery fluid line is not part of a closed fluid cycle.

11. A production plant as set forth in claim 1, wherein the heat exchanger comprises an evaporator and wherein the medium within the energy-recovery fluid line is a refrigerant that evaporates at a temperature within the expected temperature range of flue gas exiting the scrubber.

12. A production plant as set forth in claim 11, wherein the energy-recovery system comprises a turbine downstream of the evaporator, and wherein the turbine is operably coupled to a generator.

13. A production plant as set forth in claim 12, wherein the energy-recovery system comprises a condenser downstream of the evaporator, a compressor downstream of the condenser, and an expander upstream of the evaporator.

14. A production plant as set forth in claim 11, wherein the energy-recovery system provides heated water to a house-water supply and/or serves to heat ventilation air.

15. A production plant as set forth in claim 1, wherein the medium within the energy-recovery fluid line is a liquid that does not evaporate within an expected temperature range of combustion gas within the exhaust line exiting the scrubber.

16. A production plant as set forth in claim 15, wherein the medium conveyed by the energy-recovery fluid line is water.

17. A production plant as set forth in claim 15, wherein the energy-recovery system comprises a pump for pumping the liquid through the energy-recovery fluid line.

18. A production plant as set forth in claim 15, wherein the energy-recovery system provides heated water to a house-water supply, and/or serves to heat ventilation air.

19. A production plant as set forth in claim 1, wherein condensate is extracted from the exhaust line upstream of the heat exchanger, and wherein the extracted condensate:
is further processed;
is returned to the scrubber,
is added into a primary-process-fluid line, and/or
is plumbed to a situation requiring high quality water.

20. A production plant comprising:
a primary-process system including a furnace which combusts fuel to further production of a primary product, a stack through which flue gas exits the production plant, an exhaust line extending from the furnace to the stack, and a scrubber which introduces water into the exhaust line, and
an energy-recovery system including a fluid line for conveying a medium and a heat exchanger placing the fluid line in heat-transfer relationship with the exhaust line downstream of the scrubber;
wherein the scrubber causes pollutant particles within the flue gas to be captured in liquid droplets and/or pollutant gasses within the flue gas to be dissolved or absorbed into the liquid; and wherein the flue gas exiting the scrubber is at water-saturation conditions.

\* \* \* \* \*